Jan. 13, 1970    L. G. McMULLEN ET AL    3,489,303
POWER LOADER

Filed June 3, 1968    2 Sheets-Sheet 1

INVENTORS
LARRY G. McMULLEN,
MAURICE A. POPELIER &
BY    ALBERT J. VAN AUWELAER

William A. Murray
ATTORNEY

Jan. 13, 1970　　　L. G. McMULLEN ET AL　　　3,489,303
POWER LOADER

Filed June 3, 1968　　　　　　　　　　　　　　　　2 Sheets-Sheet 2

*INVENTORS*
LARRY G. McMULLEN,
　　MAURICE A. POPELIER &
BY　ALBERT J. VAN AUWELAER

*William A. Murray*
ATTORNEY

3,489,303
POWER LOADER
Larry Gene McMullen, Maurice Alois Popelier, and Albert Joseph Van Auwelaer, East Moline, Ill., assignors to Deere & Company, Moline, Ill., a corporation of Delaware
Filed June 3, 1968, Ser. No. 734,085
Int. Cl. E02f 3/28; A01b 51/00
U.S. Cl. 214—131                         5 Claims

ABSTRACT OF THE DISCLOSURE

A power loader that is composed of a tractor body having a rear transverse axle with rear traction wheels associated therewith and a U-shaped loader frame that has its sides rigidly connected to the axle and extends forwardly therefrom around the forward end of the tractor body. A fore-and-aft extending horizontal pivot extends between the front end of the tractor and the front transverse end of the loader frame and serves as the only connection between the frame and tractor body. The loader frame supports the front steerable wheels and consequently the entire tractor body is isolated against torsional stresses by the loader frame.

BACKGROUND OF THE INVENTION

This invention relates to a power loader that is composed of a main tractor portion having a rear transverse axle structure and a forwardly projecting tractor body that is inwardly of a loader frame that has its rear ends connected to the tractor body and extends forwardly around the tractor body and is connected thereto only by a fore-and-aft extending horizontal pivot.

It has heretofore been known to provide mounting means between a loader frame and a tractor body that is self-adjusting to permit some stress and distortion in the frame not to be transmitted directly to the tractor body. Such a structure is shown in U.S. Patent 3,335,882 which issued to H. Engesser et al. Aug. 15, 1967. In this particular design, the loader frame is supported on the tractor body by a pair of transversely spaced fore-and-aft extending horizontal pivots which serve the purpose of permitting the side frames of the loader to rock on the respective pivots and to slide fore and aft when desired. Since the distortion in the frame is relatively small, the amount of free movement in the connection between the frame sides and the tractor body need only be of small quantity.

The problem that exists in such a structure as shown in the aforementioned patent is that although there is relatively free movement between the loader frame and tractor body there is nevertheless imparted in the tractor body the full load of the loader. Therefore, while the loader frame may be constructed to yield due to the large loads imparted into the lift arms, the tractor body is not normally so constructed. Often this will cause failure in various portions of the tractor since it does impart heavy strain on parts of the tractor that are not so constructed to withstand the strain. Also, most tractors carry front steerable wheels that are carried on transverse axle structure which is pivoted to the underside of the tractor. Consequently the transverse structure carrying the steerable wheels will often times strike the underside of the tractor body and impart a torsional load or impact into the body. When the tractor is carrying extremely heavy loads, which may often occur when a loader bucket is used, this impact creates abnormally large torsional forces in the tractor body which also, in many cases, creates failure in the tractor.

SUMMARY OF THE INVENTION

With the above in mind it is the primary object of the present invention to provide a loader-tractor implement in which the basic tractor is composed of transverse axle structure and a tractor body that is fixed to and projects forwardly from the axle structure. As is conventional the rear axle structure carries the traction wheels for the implement. There is also to be provided a loader frame that has opposite fore-and-aft extending sides positioned alongside the tractor body and a transverse forward side that is in forward opposed relation to the forward side of the tractor body. The rear ends of the frame sides are rigidly attached to the tractor body and the forward transverse end of the loader frame is pivotally connected to the forward end of the tractor body so as to yield angularly on the pivot if the stresses on the loader frame are sufficiently great to slightly distort the frame. The loader frame carries the front steerable wheels and the front steerable wheels are mounted on transverse forward axle structure that is pivotally mounted on the underside of the loader frame. There are suitable abutments provided on the underside of the loader frame which prevent the transverse axle structure for the steerable wheels from contacting the underside of the tractor body. Thus, any large twisting or torsional load on the loader frame is transmitted directly to the rear axle structure and the tractor body carries only the direct load of the loader through the pivotal connection at its forward end.

DESCRIPTION OF THE PREFERRED EMBODIMENT

Figure 1:
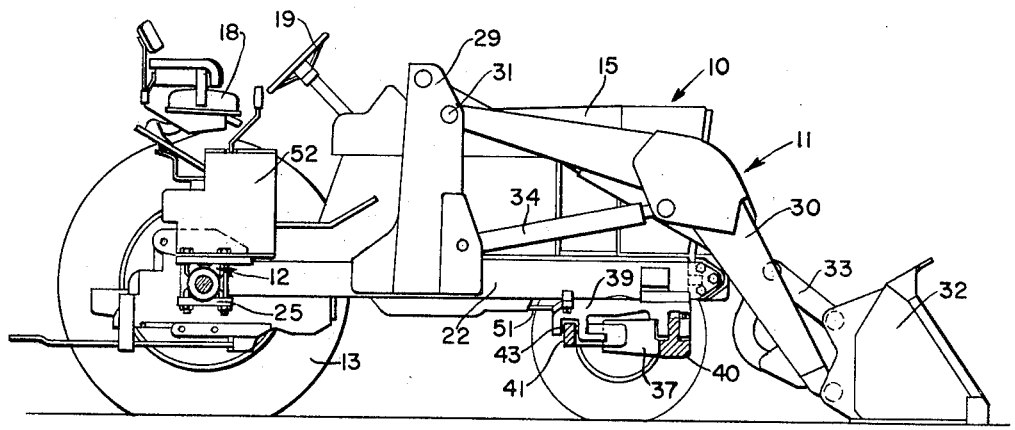
FIG. 1 is a side view of the tractor and loader with the wheels on the right-hand side of the tractor removed.
Figure 2:
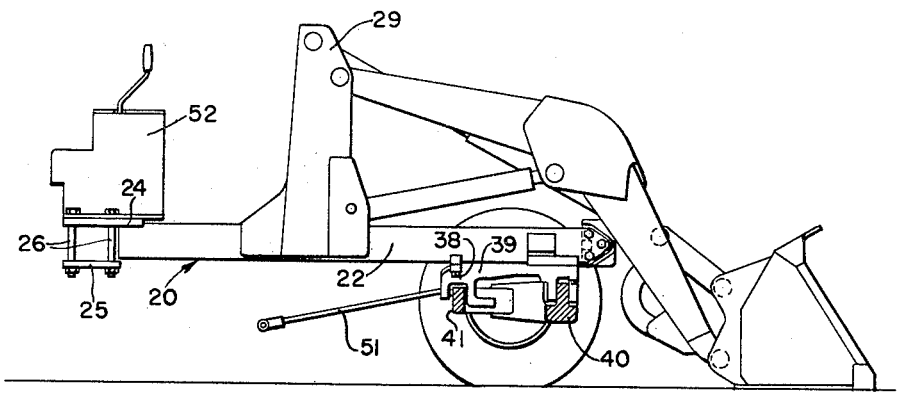
FIG. 2 is a side view of the implement, the implement frame and the front steering wheels detached from the tractor portion of the assembly and shown partially in section with the front right wheel removed.
Figure 3:
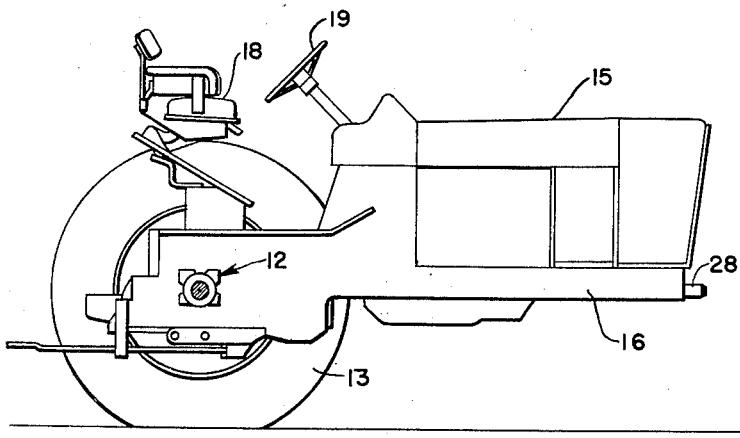
FIG. 3 is a side view of the tractor portion of the assembly with the right traction wheel removed.
Figure 4:
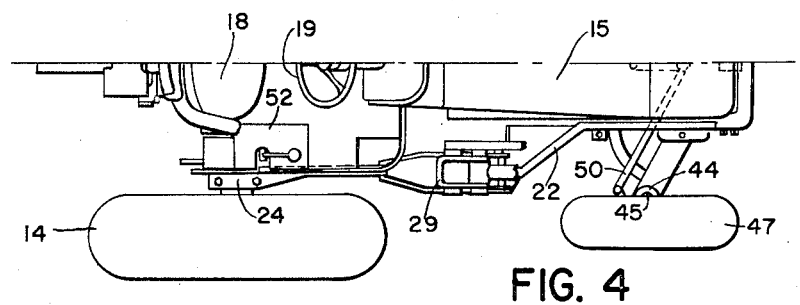
FIG. 4 is a plan view of the right-hand portion of the tractor and part of the implement frame.
Figure 5:
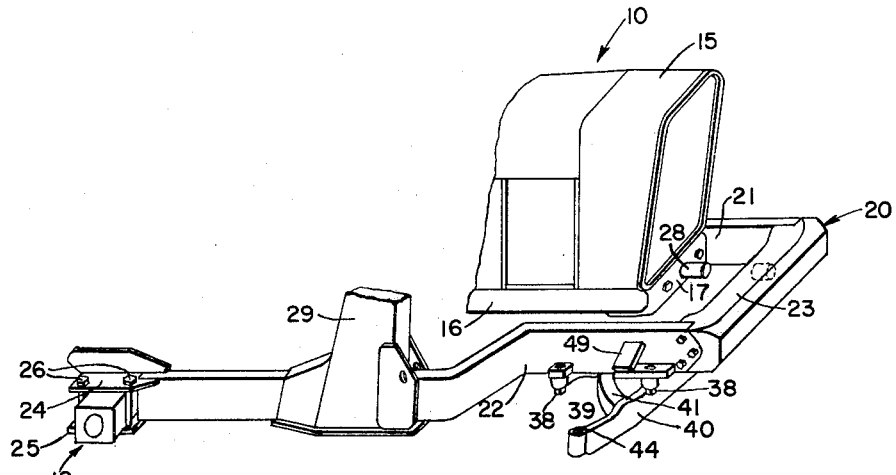
FIG. 5 is a front and side perspective view of a forward portion of the tractor and a portion of the implement frame.
Figure 6:
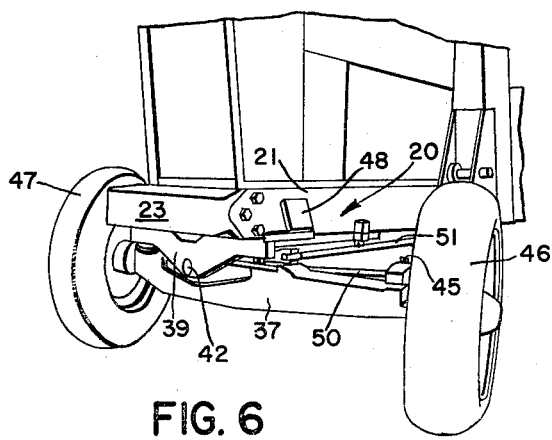
FIG 6 is a front perspective view of a portion of the tractor and implement.

The tractor-loader assembly is composed of two basic units, a tractor 10 and an implement 11. The tractor 10 includes rear transverse main axle structure 12 having transversely spaced traction wheels 13, 14 mounted thereon. Projecting forwardly from the axle structure is a tractor body 15 that includes a main frame 16 with a front transversely extending end 17. The tractor body 15 also has an operator's station indicated in its location by a seat 18 and a steering wheel 19. It supports the main power source or engine which drives the axle of the rear axle structure 12.

The implement 11 is composed of a horizontal implement frame 20 having substantially identical left- and right-hand fore-and-aft extending sides 21, 22 that are interconnected at their forward ends by a transverse end structure 23. The rear ends of the frame sides 21, 22 flare outwardly and are provided with horizontal plates 24 that ride on the axle structure 12. The plates 24 serve as the upper part of a clamping structure that includes a lower plate 25 that underlies the axle structure 12 and clamping bolts 26 disposed forwardly and rearwardly of the axle structure 12 and which operate to rigidly fix the rear ends of the frame sides 21, 22 to the axle structure 12. The transverse forward end 23 of the frame 20 serves as a counterweight for the forward end of the implement and has a hollow horizontal fore-and-aft extending hole cut in its rear side. Provided on the forward end 17 of the tractor body is a horizontal pivot pin 28 that is received in the horizontal front portion 23 and permits the frame 20 to self-adjust itself angularly on the pin 28. The entire frame 20 may be considered as a wrap-around type frame with the forward transverse end 23 in forward opposed relation to the forward end 17. The implement frame 20 also has a pair of upright posts 29 rigid with and projecting upwardly from the sides 21, 22 intermediate the end 23 and the axle structure 12. A pair of bucket-supporting lift arms 30 are pivotally connected at 31 to the upper ends of the posts 29 and project forwardly of the tractor to a forwardly positioned loader bucket 32. The bucket 32 is tilted at about the forward end of the arms 30 by means of linkages 33 controlled in a conventional manner to position the bucket. The lift arms 30 are raised and lowered by power means or hydraulic cylinders 34 that extend from the lower ends of the posts 29 to a midportion of the lift arms. It therefore becomes obvious that the entire load of the bucket 32 is transmitted to midportions of the side frames 21, 22 and consequently distortion or possibly torsional loads will occur in the frame 20 so as to require minute self-positioning of the frame 20 on the pin 28. However, it should be recognized that any torsional load created on the frame 20 is transmitted to the rear axle structure 12, one of the strongest portions or parts of the tractor and not in any manner to the tractor frame 16 or body 15. The pin 28 serves only to carry the weight of the implement and the load the implement carries. Any distortion in the frame 20 is not in any manner imparted into the pivot pin 28. Thus, the tractor body 15 is generally suspended at its forward end on the implement frame rather than in the conventional manner in which the implement frame is suspended by the tractor body. A front axle structure 37 is carried on an axle support 39 that is bolted to the underside of the frame 20. The axle support 39 is detachably fixed by bolts 38 to the frame 20. The axle is a rigid bow-shaped structure having front and rear horizontally disposed members 40, 41 that fit in suitable recessed portions of the support 39. The axle structure 37 is connected to the axle support 39 by means of fore-and-aft aligned and horizontal pivot pins 42, 43. The outer ends of the axle support 39 are provided with outer vertical openings 44 that receive kingpins 45 on which are mounted front steerable wheels 46, 47. The sides 21, 22 of the frame 20 are provided with abutments 48, 49 respectively that are vertically aligned with the front part 40 of the axle structure and serve to prevent direct contact between the axle structure and the tractor frame 16. The abutments therefore create a condition in which contact between the axle structure and the frame will also be transmitted to the rear axle structure 12 and will not in any manner be carried to the tractor frame 16 or the tractor body 15. The wheels 46, 47 are provided with steering linkage, indicated in its entirety by the reference numeral 50, which in turn is controlled by a steering rod 51 extending forwardly from an area beneath the steering wheel 19. The steering control mechanism is of the type shown and described in U.S. Patent 3,357,508 which issued to John D. Gleeson, Jr. and Merle L. Miller on Dec. 12, 1967. The details of the steering provide no part of the present invention and consequently should more information be desired relative to the steering, such may be had by reference to the aforementioned patent.

Normally a single implement will be retained on the tractor 10 for the entire life of the implement or tractor. However, in some instances it will be desirable to remove the loader-type implement and mount a different type of implement on the tractor. For example, it may be desirable to mount a similar frame 20 on the tractor body but to support a bulldozer blade structure on the frame 20. This may be relatively easily done by merely detaching the bolts 26 and moving the entire implement off of the tractor body and replacing it with the frame 20 of a different type of implement. Since, therefore, it is possible to remove the implement a valve control assembly 52 for the hydraulic units on the implement is supported on the frame side 22 and will be removed with the implement. The entire front wheel structure may be removed and replaced on a second implement frame 20 by removing and replacing bolts 38.

We claim:
1. A tractor-implement comprising: a rear transverse axle structure having transversely spaced traction wheels; a tractor body including a tractor frame projecting forwardly from the axle structure to a transverse forward end, an outer frame extending around the tractor frame, the outer frame having opposite fore-and-aft extending sides adjacent to opposite sides of the tractor frame and extending from rear ends rigidly attached to the axle structure to an adjoining forward transverse portion in forward opposed relation to the forward transverse end of the tractor frame; fore-and-aft extending pivot means connecting the forward transverse portion of the outer frame to the forward end of the tractor to permit shifting between the portion and end; front steerable wheels supported on the outer frame adjacent its front end portion; and an earth-moving implement including a pair of lift arms supported for vertical movement on the outer frame; and power means between the lift arms and outer frame for adjusting the arms vertically.

2. The structure as set forth in claim 1 in which the fore-and-aft extending pivot means also permits relative fore-and-aft shifting between the two frames.

3. The structure as set forth in claim 1 further characterized by steerable wheels being mounted on transverse structure beneath the outer frame and the transverse structure is connected to the outer frame to swivel on a fore-and-aft horizontal pivot, and there is abutment means between the transverse structure and said outer frame which prevents the transverse structure from contacting and imparting torsional stresses in the tarctor body.

4. The structure as set forth in claim 1 in which the outer frame has a pair of posts intermediate the forward transverse end and axle structure and on opposite sides of the tractor body, the posts being rigid with and projecting upwardly from the sides of the outer frame, the lift arms are supported on the posts, and the power means are hydraulic cylinders connected to the lift arms and to the outer frame adjacent the lower ends of the posts.

5. A tractor-loader comprising: a tractor body having a main fore-and-aft extending frame supported at its rear end on transversely extending axle structure and composed of opposite fore-and-aft extending sides rigidly joined with and extending forwardly from the axle structure to a front end extending transversely between the sides; traction wheels on opposite ends of the axle structure; a main power plant on the frame; a wrap-around implement frame extending around the forward end of the tractor and having a front transverse end forwardly of the main frame's front end and rigid fore-and-aft extending sides outwardly of the respective sides of the main frame extending from the transverse end to rear ends adjacent the axle structure; means fixing the rear ends to the axle structure; fore-and-aft extending pivot means extending between and connecting the transverse front end of the tractor frame and the fornt end of the implement frame for accommodating minute warping of the implement frame; implement lift arms pivotally supported on the implement frame for vertical movement and extending forwardly of the tractor; power lift means extending between the implement frame and lift arms; and steerable wheel means carried on the implement frame at the forward ends of the main frame and implement frame.

References Cited

UNITED STATES PATENTS 3,131,823   5/1964   Foster et al. _____ 172—273 X
3,335,882   8/1967   Engesser et al. _____ 214—131

HUGO O. SCHULZ, Primary Examiner

U.S. Cl. X.R.

172—273; 214—140